United States Patent [19]

Kidd

[11] Patent Number: 5,024,112
[45] Date of Patent: Jun. 18, 1991

[54] GYROSCOPIC APPARATUS

[75] Inventor: ALexander D. Kidd, Barnhill, Scotland

[73] Assignee: Noel Carroll, Victoria, Australia; a part interest

[21] Appl. No.: 378,236

[22] PCT Filed: Dec. 9, 1987

[86] PCT No.: PCT/AU87/00418
§ 371 Date: Aug. 3, 1989
§ 102(e) Date: Aug. 3, 1989

[87] PCT Pub. No.: WO88/04363
PCT Pub. Date: Jun. 16, 1988

[30] Foreign Application Priority Data

Dec. 9, 1986 [GB] United Kingdom ............... 8629405

[51] Int. Cl.$^5$ ...................... G01C 19/06; F16H 27/04
[52] U.S. Cl. ..................................... 74/5.37; 74/84 S
[58] Field of Search ....................... 74/84 S, 5.37, 5.34

[56] References Cited

U.S. PATENT DOCUMENTS

| 3,968,700 | 7/1976 | Cuff | 74/84 S |
| 4,409,856 | 10/1983 | de Weaver | 74/5.37 X |
| 4,770,063 | 9/1988 | Mundo | 74/84 S |

FOREIGN PATENT DOCUMENTS

| 695683 | 8/1940 | Fed. Rep. of Germany | 74/5.34 |
| 2341245 | 5/1975 | Fed. Rep. of Germany | 74/84 S |
| 1024328 | 3/1953 | France | 74/5.34 |
| 0056182 | 4/1985 | Japan | 74/5.34 |
| 2090404 | 7/1982 | United Kingdom | 74/5.34 |

Primary Examiner—Rodney H. Bonck
Attorney, Agent, or Firm—Ladas & Parry

[57] ABSTRACT

A gyroscopic apparatus (100), having application as a prime mover, comprises a pair of discs (102) disposed opposite one another with arms (104) rotatably supporting the discs (102) connected at a pivot point, the pivot axis thereof lying in a plane midway between the discs (102). A drive arrangement (124, 126, 180) operates to spin the discs (102) in opposite directions while simultaneously rotating the whole assembly of discs (102) and arms (104) about a second axis in the same plane as, but perpendicular to, the pivot axis. A camming arrangement (144, 146, 152) working in conjunction with the rotation about the second axis periodically forces the spinning discs (102) to pivot about the pivot axis to thereby generate a force along the second axis which can be used to perform useful work.

20 Claims, 8 Drawing Sheets

GYROSCOPIC APPARATUS

The present invention relates to a gyroscopic apparatus particularly, but not exclusively, for providing a source of energy. More particularly, the present invention relates to a gyroscopic apparatus having application as a prime mover on land, water or in space.

A gyroscope can, in its broadest aspect, be considered as an object rotating about a fixed point, and for practical purposes a gyroscope consists of an axially symmetrical rotating body. A significant feature of a gyroscope is that the angular momentum and the rotational axis preserve their direction as long as no external forces act upon the gyroscope, and because of these tendencies the gyroscope is often used as a movement stabiliser. To increase the rotational momentum the gyroscope is generally constructed with its mass as far as possible from the axis of rotation. This can be readily achieved using a disc with a thickened rim.

As the gyroscope precesses about its axis a considerable amount of energy is stored in the device by virtue of its rotating mass. However, conversion of this energy to useful work is poorly documented. Release of this energy along the precession of rotation axis as the device rotates would generate a thrust which could have many diverse applications.

When angular velocity changes direction but constant in magnitude, the angular acceleration is known as gyropscopic acceleration and the couple which produces the acceleration is known as a gyroscopic couple. In the case of a disc rotating about in a vertical plane about a horizontal axis with angular velocity ω, which is at the same time spinning about a spin axis, a gyroscopic couple is created which is orthogonal to the plane of precession and the plane of rotation. The sense of the gyroscopic couple depends on the direction of rotation of the disc and of the precession axis.

An object of the present invention is to provide a gyroscopic apparatus which is capable of generating a pulsatile force.

In accordance with the present invention there is provided a gyroscopic apparatus comprising:

a pair of rotatable masses disposed opposite one another;

means for mounting said masses which enable said masses to pivot about a pivot axis, said pivot axis lying in a mirror image plane which is directly between said masses;

drive means for driving said masses so as to give said masses respective opposite angular momentums, having directions substantially perpendicular to and directed away from said plane, and for driving said apparatus so as to rotate said masses about a central axis which is in said plane and perpendicular to said pivot axis;

means for periodically forcing said masses towards one another from a predetermined position and allowing said masses to return to said predetermined position so as to generate a pulsatile force in said mounting means.

Accordingly, in one aspect of the present invention there is provided a gyroscopic apparatus comprising:

a first shaft adapted to be rotated about a precession axis, at least two second shafts generally disposed orthogonally to said first shaft and coupled to said first and each second shaft having an end carrying a rotatable mass thereon, said masses being substantially diametrically disposed and being rotatable in different directions about a respective shaft axis, drive means adapted to rotate said orthogonal second shafts and said rotatable masses as said apparatus spins about said precession axis, mass support means coupled between said first shaft and each orthogonal shaft for supporting each mass during rotation of said gyroscopic thrust apparatus about said precession axis, mass reciprocating means coupled between said first shaft and said mass support means for causing said masses to reciprocate in rectilinear movement as said masses rotate about said precession axis, and thrust bearing means disposed on said first shaft at an upper end thereof for transmitting thrust axially along said first axis, the arrangement being such that, in use, said gyroscopic thrust apparatus is rotated about said precession axis and said masses are rotated about each respective shaft axis and are also reciprocated in a direction substantially orthogonal to said precession axis, and as the speed of rotation reaches a predetermined value, pulsatile force is created which acts through said mass support means to create an upward thrust on said first shaft which transmits said upward thrust to said thrust bearing.

Preferred embodiments of the present invention will hereinafter be described, by way of example only, with reference to the accompanying drawings, wherein.

Figure 1:
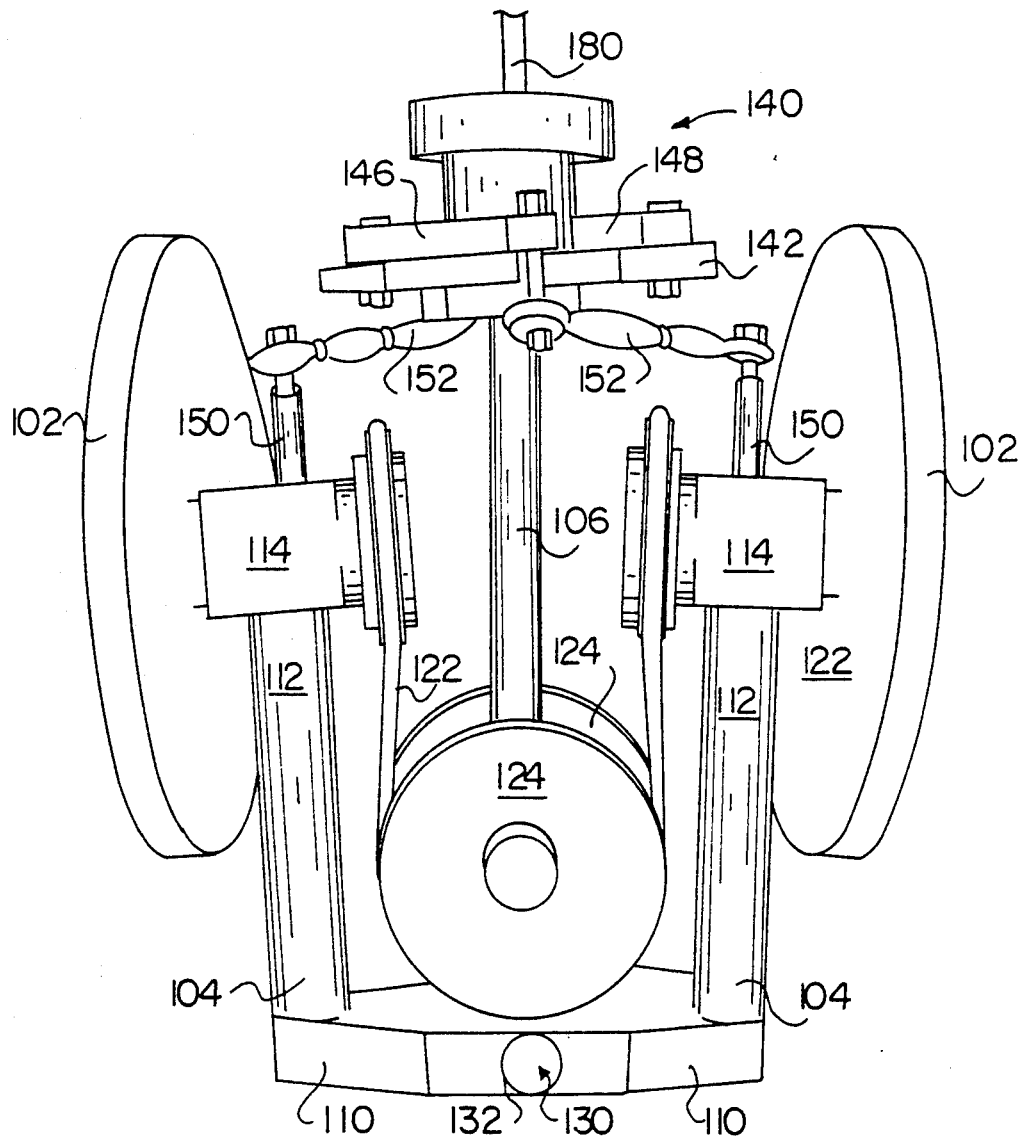
FIG. 1 is a perspective view of a first preferred embodiment of a gyroscopic apparatus according to the present invention.

A gyroscopic thrust apparatus 100, as shown in FIGS. 1 to 4, comprises a pair of opposed identical rotatable discs 102, two respective arms 104 used to mount and support the discs 102 and a central rotatable shaft 106. The arms 104 are "L" shaped and each has a base portion 110 and an upwardly extending column portion 112. At the top of each column portion 112 there is disposed a shaft mounting block 114 which is adapted to receive a rotatable shaft 116. Both ends of the rotatable shafts 116 extend from their respective mounting blocks 114, with one end being fixed to the centre of a respective disc 102 and the other end being fixed to a respective pulley wheel 118.

The discs 102 are driven by the pulley wheels 118 so as to give discs 102 an angular momentum $\underline{L}$ along the axis of rotation 120 of the discs 102 and directed away from the central shaft 106. The pulley wheels 118 are driven by a flexible cable 122, which in turn is driven by a pair of coaxial driving wheels 124. The axis of the driving wheels 124 is perpendicular to the axis 120 of the coaxial pulley wheels 118. The driving 124 wheels are driven by a shaft 126 which is coupled to a driving mechanism, described below with reference to FIG. 5.

The arms 104 are pivotal about a pivot axis 130 at which the bases are hinged and connected to a coupling pin 132. The positioning of the arms 104 is controlled by a linkage arrangement 140, illustrated in FIGS. 1 and 2. The linkage arrangement 140 comprises a plate 142 adapted for rotation about the axis of the central shaft 106 with respect to a cam 144. Two link arms 146 and 148 are disposed opposite one another and adjacent the cam 144. Each link arm 144 and 146 is fixed to the plate 142 at one end thereof so that end is only able to pivot in a horizontal plane parallel to the plane of the plate 142. A side surface of the each link arm 146 and 148 abuts the cam 144 so that on rotation of the plate 142 with respect to the cam 144 the free ends of the link arms 146 and 148 are pivoted with respect to their fixed ends by virtue of the action of the cam 144. The arms 104 of the discs 102 include a coupling portion 150 fixed to the top of each mounting block 114 and the coupling portions 150 are coupled respectively to the free ends of the link arms 146 and 148 by lost motion links 152.

Figure 5:
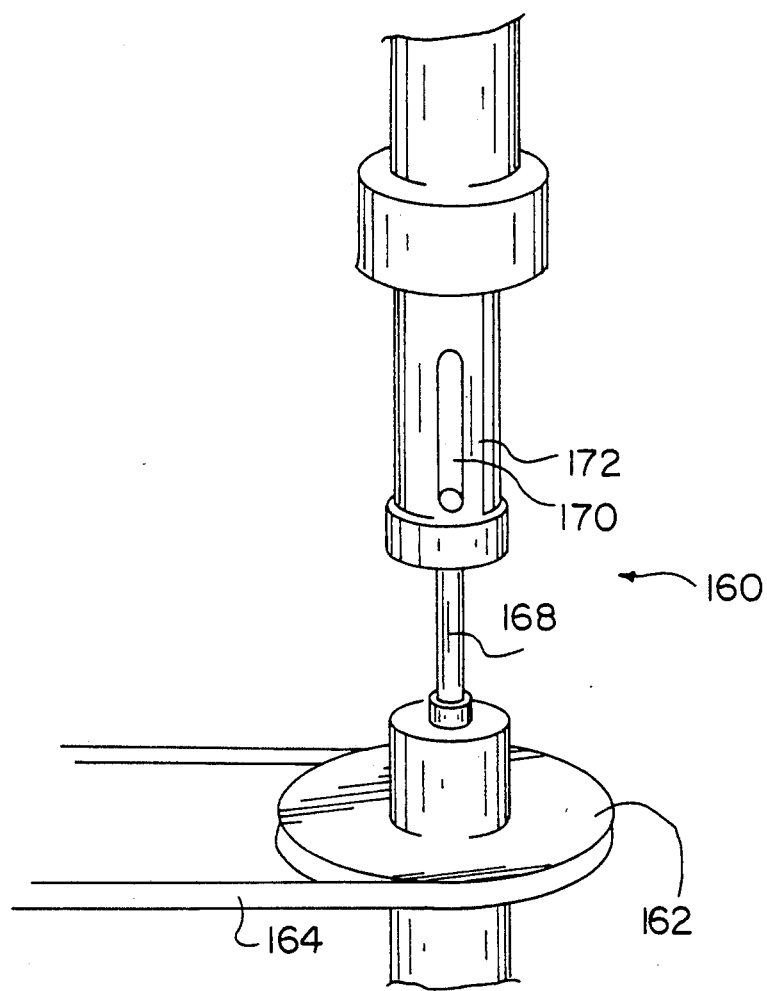
FIG. 5 is a perspective view of a drive coupling mechanism of the apparatus of FIG. 1.

The driving wheels 124 are driven by a first driving mechanism 160, as illustrated in FIG. 5, which comprises a pulley wheel 162, that is driven by a drive belt 164 and has a drive shaft 168 extending therefrom. The drive shaft 168 is keyed to a slot 170 of a shaft 172 which is coupled to the shaft 126 of the driving wheels 124 by a bearing mechanism (not shown). The keyed coupling of the drive shaft 168 to the upper shaft 172 enables the gyroscopic apparatus 100 to move vertically with respect to the drive shaft 168 and the pulley 162. The vertical movement of the apparatus 100 is also facilitated by providing an inner shaft 180 which extends within the central shaft 106 such that the central shaft 106 and the apparatus 100 is slideable with respect to the inner shaft 180. The inner shaft 180 is also used to drive the apparatus 100 so as to rotate the arms 104 and the disc 102 about the axis of the central shaft 106 so as to impart a torque $\underline{T}$ directed upwards along the axis of the inner shaft 180, on the discs 102.

Figure 4:
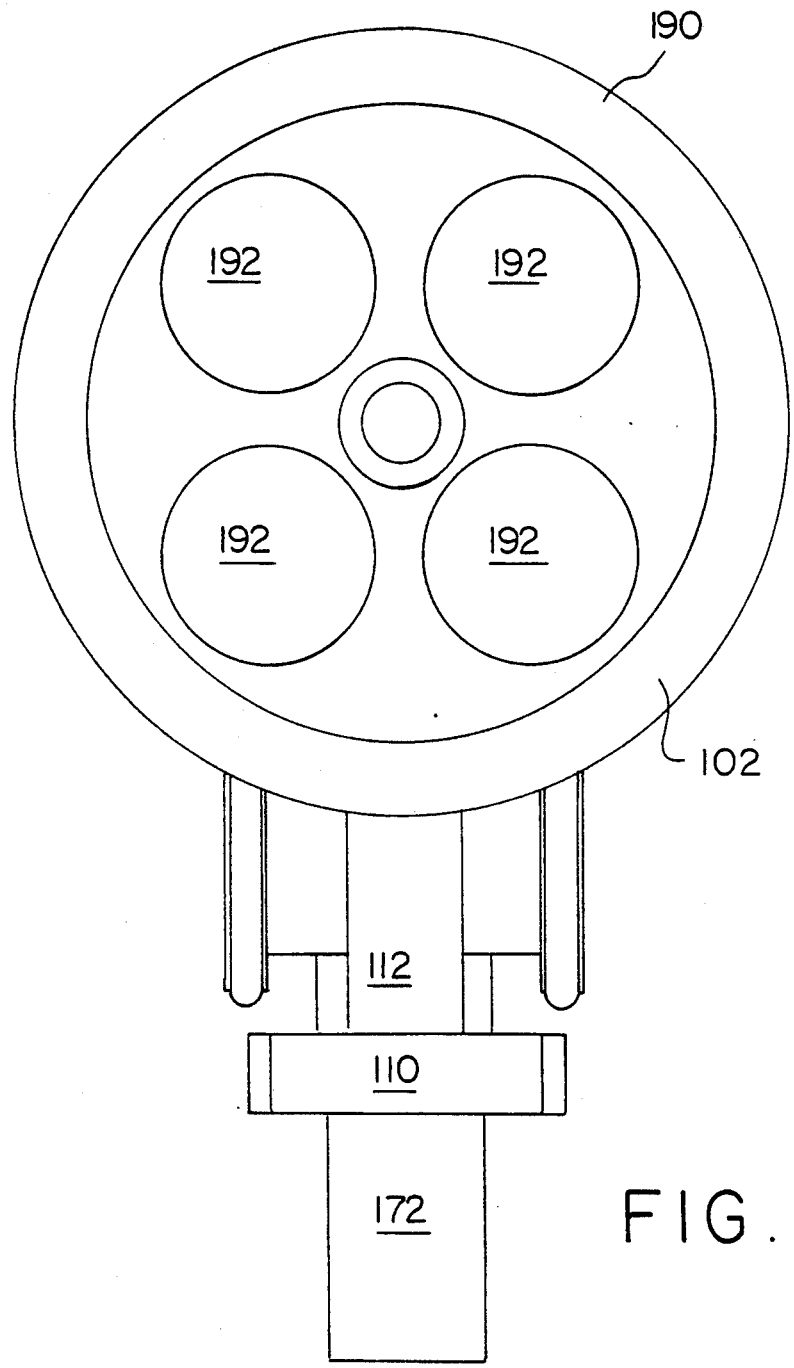
FIG. 4 is an end view of the apparatus of FIG. 1.

The discs 102, as shown in FIG. 4, are constructed so that most of their mass is concentrated on the rims 190 of the discs 102. This concentration is assisted by providing holes 192 in the discs 102 between their axis of rotation 120 and the rims 190. This gives the discs 102 a larger component of angular momentum for a given angular velocity.

The apparatus 100 is driven so as to impart an angular momentum, as discussed previously, on each of the discs 102 and at the same time rotate the apparatus 100 about the inner shaft 180. Whilst the apparatus 100 rotates the cam 144 is held fixed by a locking mechanism (not shown) so that the linkage arrangement 140 periodically pulls the discs 102 in towards one another.

As the discs 102 are rotated about the axis 120, the torque applied on the inner shaft 180 ensures that a torque is applied to the discs 102 which is perpendicular to their angular momentum and directed upwards. This torque causes a gyroscopic couple to be applied to the discs 102 by virtue of the relationship between torque and change in angular momentum, as stipulated in equation 1 below.

$$\underline{T} = d\underline{L}/dt \tag{1}$$

Figure 3:
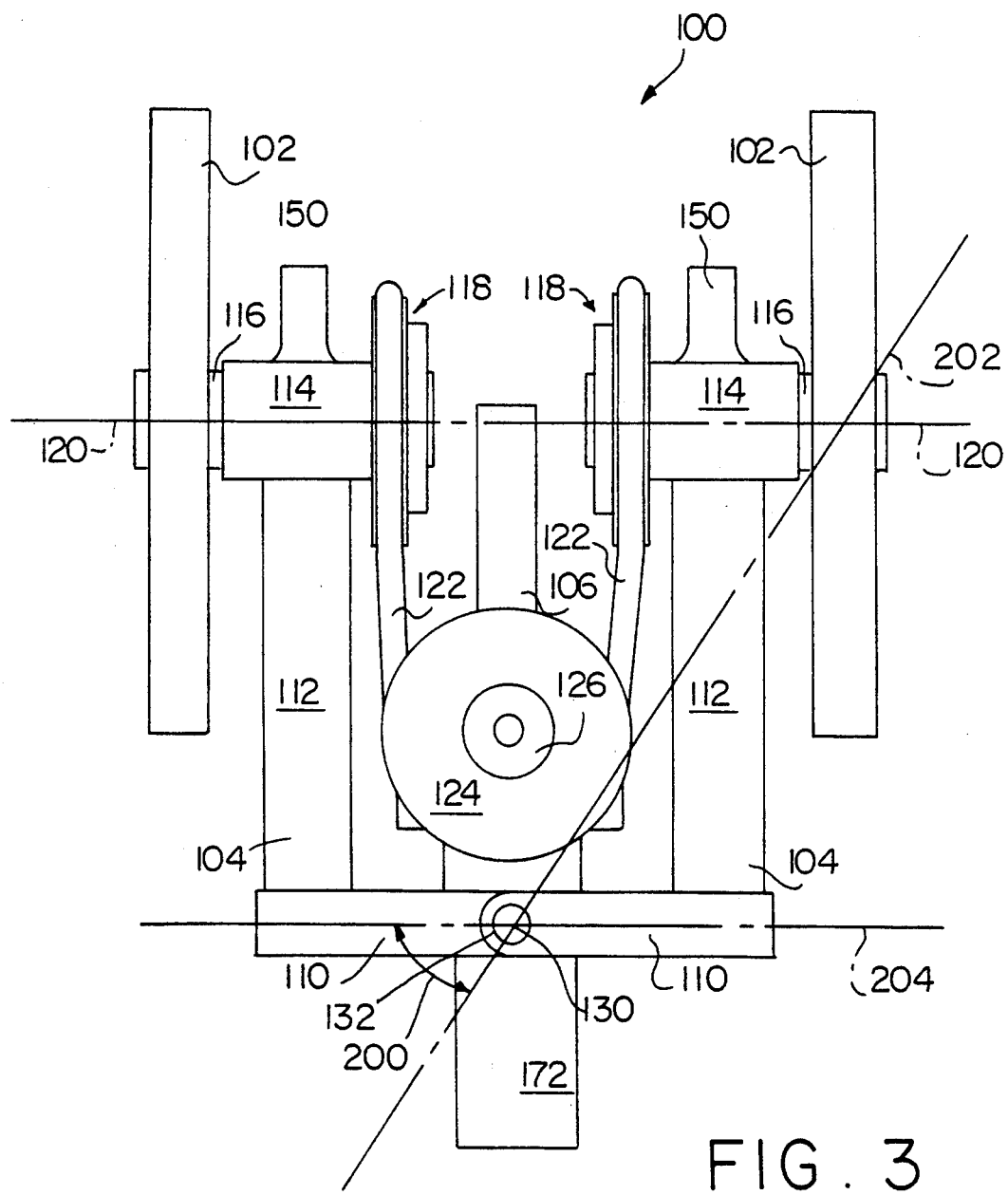
FIG. 3 is a side view of the apparatus of FIG. 1.

The applied torque causes the angular momentum of the discs 102 to change direction and move upwards, in other words causes the discs 102 to precess upwards. The discs 102, however, are also being acted upon at the same time by a centrifugal force, which is acting to move the discs 102 down to the position where their axes are aligned, as shown in FIG. 3. Utilising the action of both the gyroscopic couple and the centrifugal force, the apparatus 100 is driven so that the discs are positioned to form an angle 200, as shown in FIG. 3. The angle 200 is the angle between the plane 202, which includes the pivot axis 130 and the centre of a disc 102, and the plane 204 which is perpendicular to the applied torque. For the apparatus 100 to operate effectively the discs 102 should be positioned so that in use the angle 200 is greater is than 45°. When this occurs and the linkage arrangement 140, together with the cam 144, is used to periodically pull the discs 102 in towards one another, the centrifugal force acting on the discs 102 causes the discs 102 to move away from one another whenever the cam 144 is not acting to bring them together. The cam 144 and the linkage arrangement 140 are designed so that the discs 102, as they are rotating about the axis central shaft 106, move towards and away from each other with relatively high frequency. The discs 102 are moved in this manner so as to decrease and increase their component of angular momentum which is directed along the central axis of the shaft 106. The angular momentum of the discs 102 is changed in such a manner so as to produce a higher rate of change in one direction than in another so as to produce a torque which gives rise to an upward force in the column portions 112 of the arms 104 of the discs 102. This is preferably achieved by configuring the surface of the cam 144 so the discs 102 are moved in towards each other at a faster rate, by the action of the cam 144 and the linkage arrangement 140 than the rate at which they recover and move away from one another under the action of the centrifugal force. An alternative method involves moving one disc 102 in towards and away from the central axis 106 at one rate whilst the other disc 102 is moved in towards and away from the central shaft 106 at a slower rate. The first is achieved using a symmetrical cam 144 and the second is achieved using an asymmetrical cam 144.

The differing rates of change in angular momentum and different directions in which the changes take place result in a pulsatile force which appears in the arms 104 and causes the apparatus 100 to periodically move up and down along the inner shaft 180. Whilst the force is pulsatile and gives the apparatus 100 a vibrating motion, over a period of time, due to the differing rates of change in angular momentum, a net upward force is generated in the arms 104 of the discs 102 which may be put towards useful work.

Figure 6:
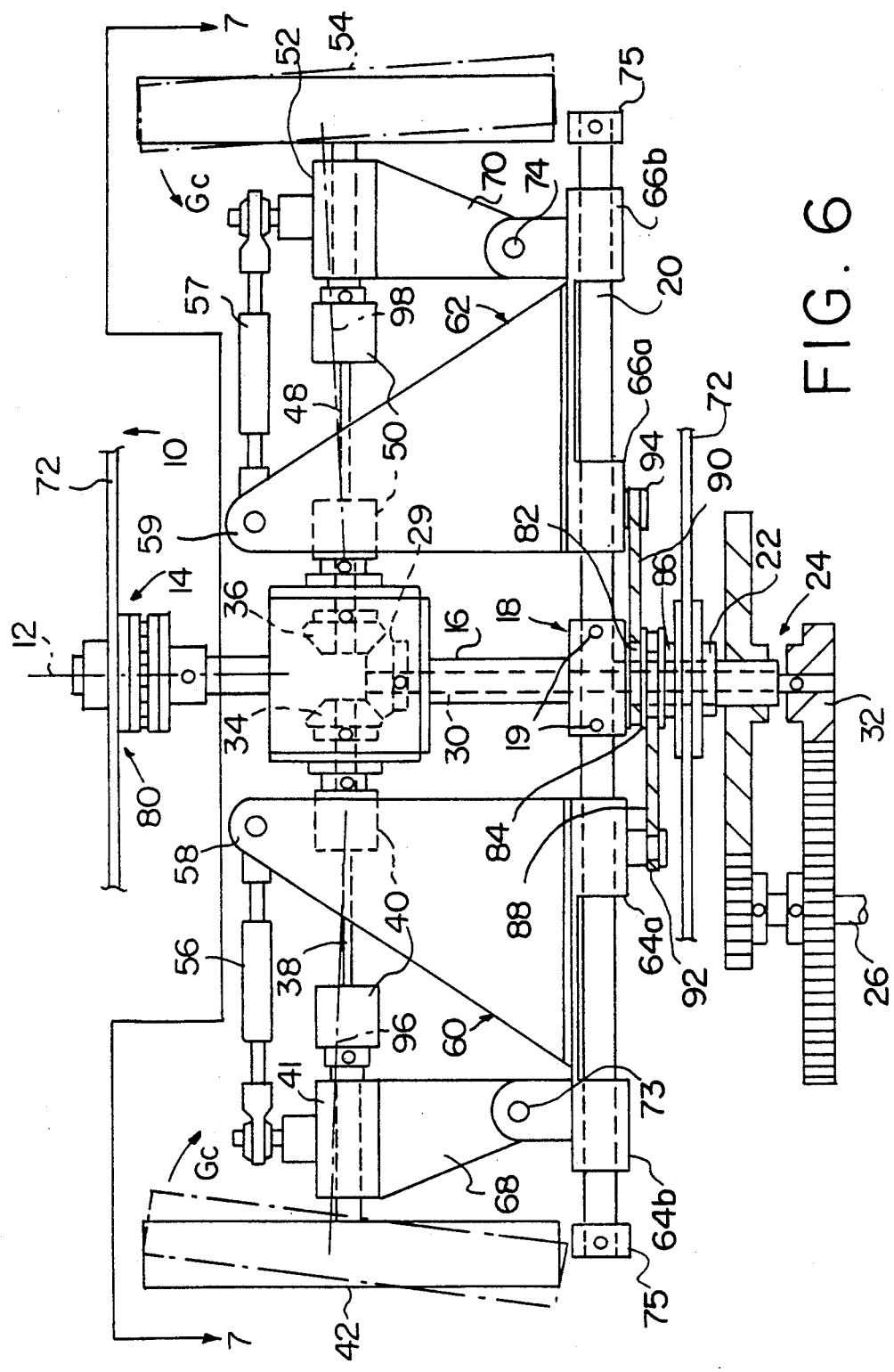
FIG. 6 is a side view of a second preferred embodiment of a gyroscopic thrust apparatus in accordance with the present invention.
Figure 7:
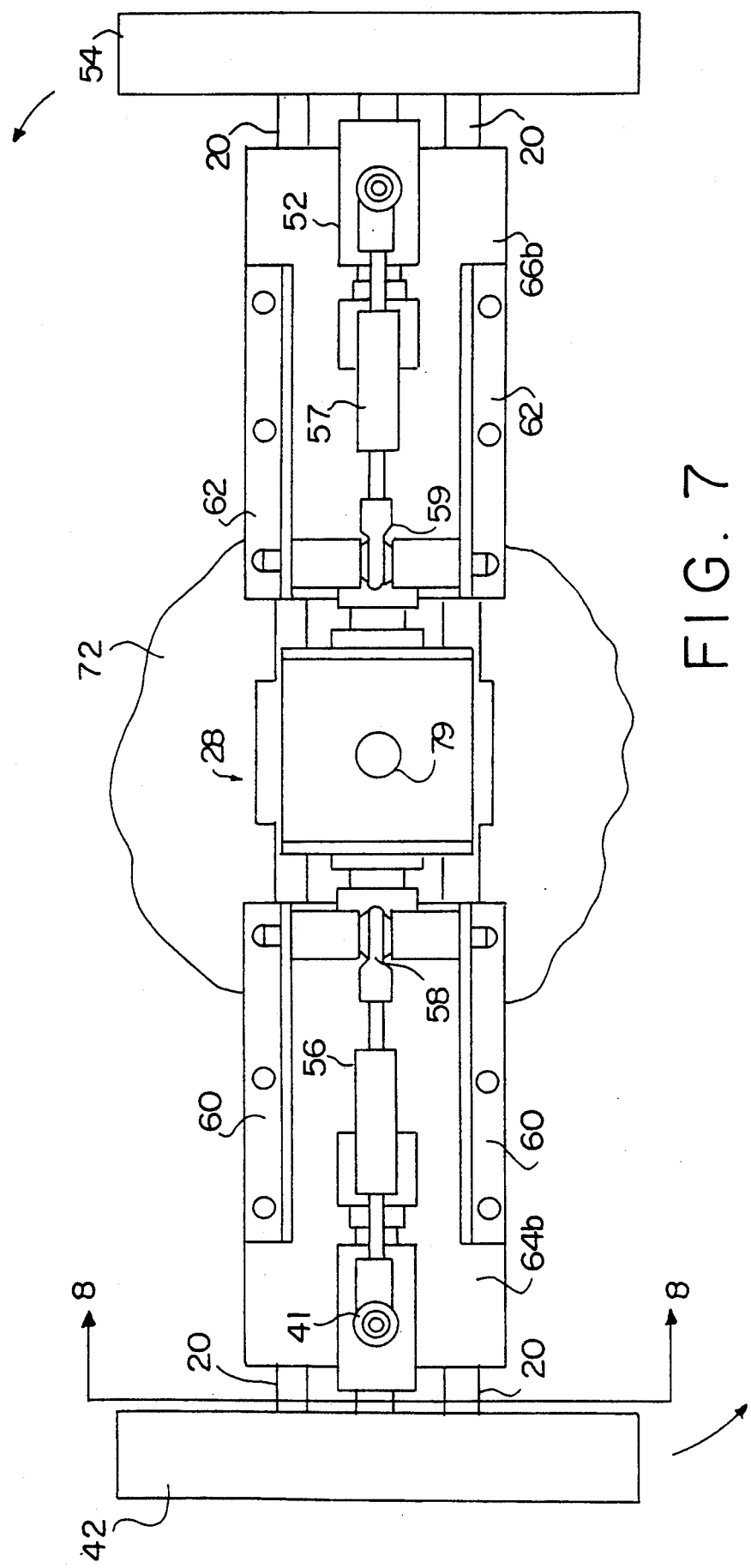
FIG. 7 is a sectional view 7—7 of the apparatus of FIG. 6.
Figure 8:
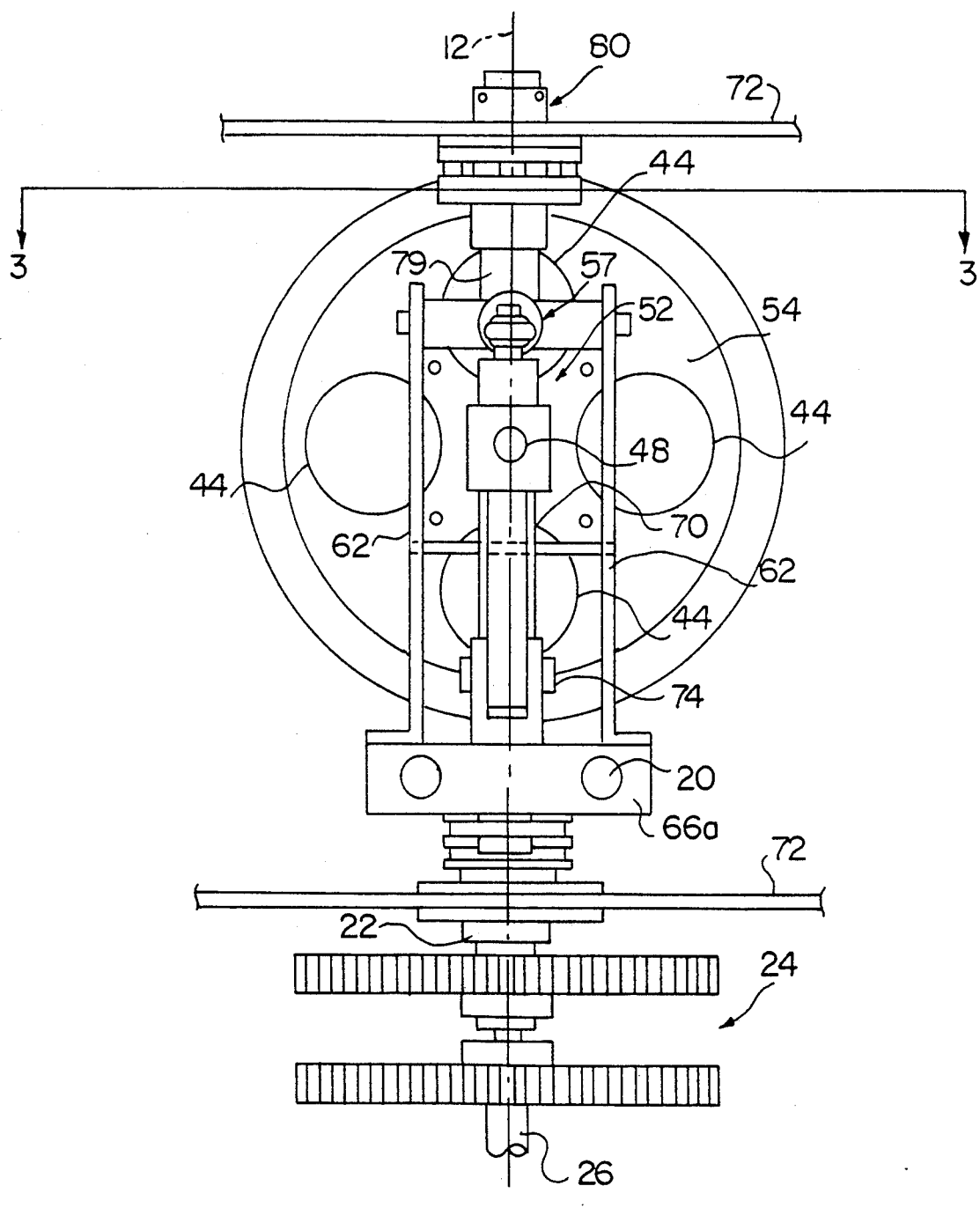
FIG. 8 is a sectional view 8—8 of the apparatus as shown in FIG. 7.

A second preferred embodiment of a gyroscopic apparatus, is illustrated in FIGS. 6 to 8 and generally indicated by reference numeral 10. The apparatus 10 is adapted to be rotated about a vertical spin or precession axis 12 so that gyroscopic couples result in an upwardly directed force onto thrust bearing 14 as will be later described in detail, and which can be used to provide work.

The gyroscopic apparatus 10 has a central shaft 16 coaxial with axis 12 which is coupled by a bracket 18 and fixing pins 19 at its lower end to a twin shafted slide unit 20. The slide unit 20 is mounted on a bottom support bearing 22 and is coupled to a gearbox drive arrangement, generally indicated by reference numeral 24 which has gears and an input power shaft 26 to which an input power source, not shown in the interest of clarity, can be connected. The entire apparatus 10 can be rotated about precession axis via gearbox drive 24.

Figure 2:
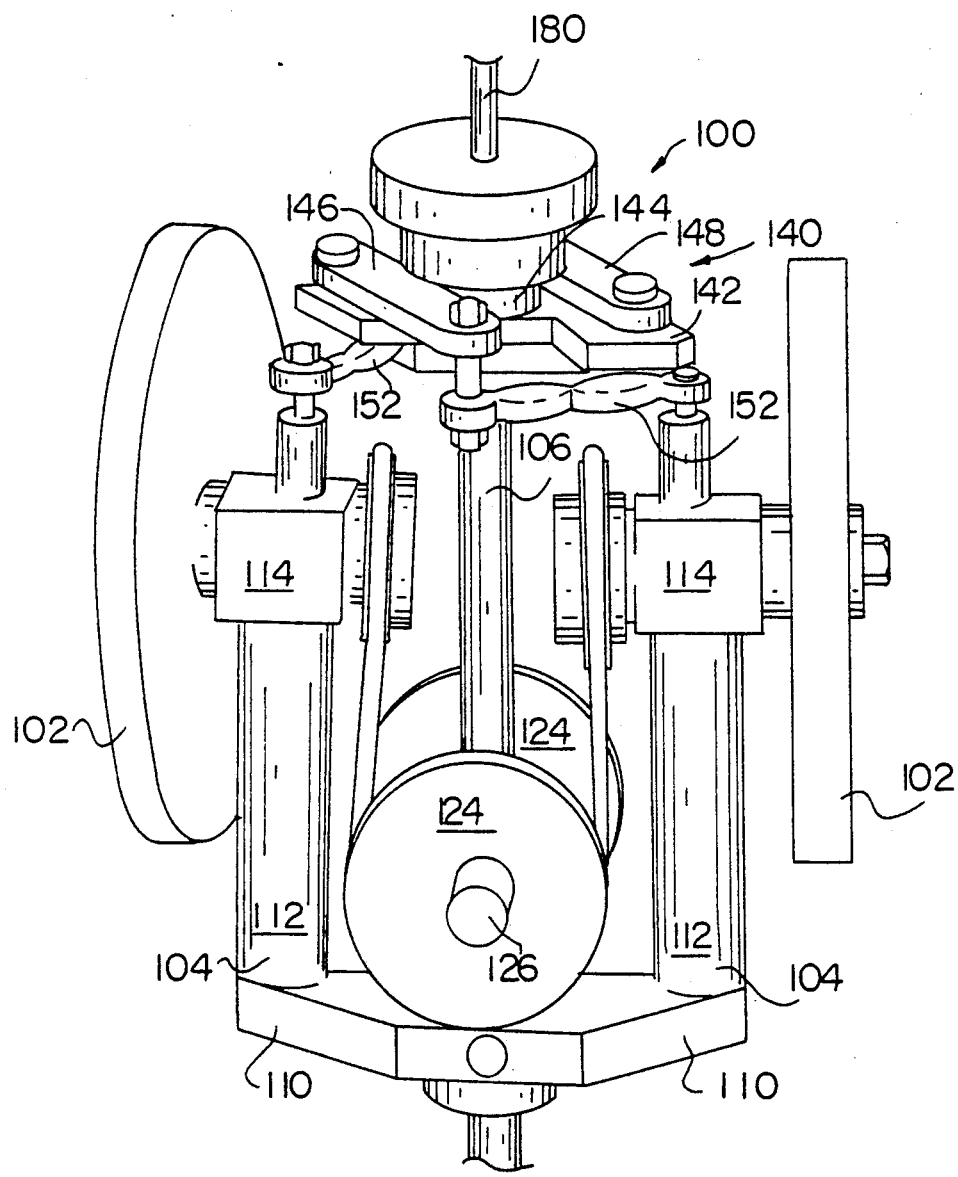
FIG. 2 is a top perspective view of the gyroscopic apparatus of FIG. 1.

The upper end of the shaft 16 is coupled to a miter gear 29 seen in broken outline within a gearbox 28. Within shaft 16 is a gyroscopic drive shaft 30, seen in broken outline, which is also driven by gearbox drive 24 and which terminates in gear 32. Coupled to gear 29 are gears 34, 36 which are adapted to be rotated in opposite directions. Coupled to gear 34 is a shaft 38 connected by universal joints 40 and bearing housing 41 to a gyroscope 42 in the form of a planar disc with four holes 44 equiangularly spaced about its circumference, as best seen in FIG. 2. The rim 46 of the disc is thickened to increase rotational momentum as aforedescribed. Gear 36 is coupled via shaft 48, universal joints 50 and bearing housing 52 to gyroscope 54 which are identical to the aforedescribed components.

Each bearing housing 41, 52 is coupled by adjustable lost motion links 56, 57 to yokes 58, 59 mounted at the top of twin brackets 60, 62. At the bottom of each bracket 60, 62 spaced guides 64a, b, 66a, b are disposed which allow the brackets to slide on respective twin slides 20 as will be described. The links 56, 57 have adjustable free-play built in to permit the gyroscopes 42, 54 to move towards the centre axis 12 as the apparatus rotates. Also, each bearing housing 41, 50 is coupled to a gyroscope housing bearing support arms 68, 70 which in turn is connected via loose stud pivotal joints 73, 74 to respective bearing support arms 60, 62 in proximity to outermost guides 64b, 66b. The slide 20 terminates in keeper plates 75 to prevent the brackets coming off the slide. Thus bearing support arms 60, 62 can pivot relative to joints 73, 74 so that bearing housings 41, 52 and hence gyros 42, 54 can move relative to their respective stop links 56, 57.

At the top of the unit the shaft 79 terminates in an upper support bearing 80 which, together with bearing 22, permits the unit 10 to be rotated about axis 12. The unit can be located in a housing 72 which is partly shown, and which can, of course, be coupled to the drive unit and device to which work is to be applied.

Disposed beneath slide 20 is a pair of opposed eccentrics 82, 84 mounted next to each other on shaft 16. The eccentrics have a support bush 86 bolted thereto and respective connecting rods 88, 90 which are connected to brackets 60, 62 via coupling pins 92, 94. It will be appreciated that as the shaft 16 is rotated bush 86 and eccentrics 82, 84 transform the rotary motion to rectilinear motion which causes the brackets 60, 62 to reciprocate on the slide 20 in opposite senses by the same amount of magnitude.

The gyroscopic apparatus 10 operates as follows:

power into the gearbox 24 causes the whole unit to rotate, for convenience in the anti-clockwise direction of the arrow in FIG. 7. Simultaneously, the drive is supplied via shafts 30, 38, 48, and joints 40, 50 to gyroscopes 42, 54 which are then rotated in opposite directions about horizontal axis 51. In addition, as the unit rotates the eccentrics 82, 84 cause brackets 60, 62 and hence gyroscopes to move reciprocally along slide 20 in opposite senses. That is the gyroscopes moves towards and away from each other in phase once per revolution and this can be considered as "pulsing" movement. Lost motion links 56, 57 and arms 60, 62 initially support the gyroscopes 42, 59 until the precession or spin speed is such that the centripetal force is sufficiently high to support the weight of the gyroscopes. As the rotational speed increases and the speed of gyroscopic rotation increases, a gyroscopic couple shown by arrows, Gc, is created for each gyroscope which, at a certain speed, rises or causes the gyroscopes to tilt upwards to be driven along new axis 96, 98 shown in dotted outline. This movement is permitted because of the freeplay in the lost motion couplings 56, 57 and because of pivotable connection 73, 74. This in combination with the pulsatile movement of the gyros 52, 54 causes a net transfer of energy from the gyros providing a pulsatile upward force acting at each joint 73, 74 which is coupled via slide 20 to shaft 16 and through gearbox 28 and shaft 79 to the lower thrust plate 15 of the thrust bearing 14. When the pulsatile frequency becomes high enough the net force appears substantially continuous and pulse-free. The thrust is transmitted through the thrust bearing to a work destination, such as vehicle drive. The reaction to the thrust is of course created by the vehicle drive.

Various modification may be made to the apparatuses hereinbefore described without departing from the scope of the invention. For example, the masses may be other than rotatable discs and two or more discs may be present. Preferably, there may be an even number of such discs and two or more shafts can be provided. Also, the discs can be rotated in the opposite direction or the unit can be driven to the opposite direction or the unit can be driven to precess in the opposite direction.

The apparatus has application in many fields, such as lifting apparatus. It is envisaged that the invention has application on land, in or under water and in space. It is believed to be particularly advantageous in space where the force of gravity and friction is minimal. The invention may also have application as a controlled force generator which is proportional to speed of rotation.

Advantages of the invention are that a controlled thrust is provided using a gyroscope which can be used in a variety of work applications. The apparatus requires no special components or materials and can readily be constructed to be drive from a variety of input sources, for example, electric motor, I.C. engine or gas turbine. Because the thrust is derived from gyroscopes the device is believed inherently stable as in the work receiving device.

I claim:

1. A gyroscopic apparatus comprising:
   a pair of rotatable masses disposed opposite one another;
   means for mounting said masses which enable said masses to pivot about a pivot axis, said pivot axis lying in a mirror image plane which is directly between said masses;
   drive means for driving said masses so as to give said masses respective opposite angular momentums, having directions substantially perpendicular to and directed away from said plane second drive means, and for driving said apparatus so as to rotate said masses about a central axis which is in said plane and perpendicular to said pivot axis;
   means for periodically forcing said masses towards one another from a predetermined position and allowing said masses to return to said predetermined position so as to generate a pulsatile force in said mounting means.

2. An apparatus as claimed in claim 1, wherein said masses are brought towards one another at a rate which is greater than the rate at which they return to said predetermined position.

3. An apparatus as claimed in claim 1, wherein one mass is moved between said predetermined position and a position at which said masses are in close proximity whilst the other mass undergoes a similar movement at a slower rate.

4. An apparatus as claimed in claim 1, wherein a first plane including said pivot axis and the centre of a mass makes an angle of at least 45° with a second plane perpendicular to said mirror image plane when said mass is substantially in said predetermined position.

5. An apparatus as claimed in claim 4, wherein said angle is approximately 48°.

6. An apparatus as claimed in claim 1, wherein said masses are rotatable discs each having a mass concentrated on the rim of the respective disc.

7. An apparatus as claimed in claim 1, wherein said mounting means comprises two arms pivotably coupled at one end by a pin at said pivot axis and having means for receiving respective rotatable shafts at the other free ends, said rotatable shafts being fixed to the centre of respective rotatable masses.

8. An apparatus as claimed in claim 7, wherein said arms are substantially "L" shaped and comprise a base portion, an upwardly extending column and a shaft mounting block disposed at the top of said column and adapted to receive one of said rotatable shafts.

9. An apparatus as claimed in claim 7 or 8, wherein said pulsatile force is generated in said arms and is substantially perpendicular to the axis of rotation of said rotatable shafts.

10. An apparatus as claimed in the claim 7, wherein said drive means comprises said rotatable shafts and a pulley mechanism which drives said rotatable shafts and in turn is driven by a drive shaft, driven by a lower central shaft which is centred on said central axis.

11. An apparatus as claimed in claim 7, wherein said drive means comprises a inner shaft disposed within a central shaft centred on said central axis and which is coupled to said apparatus so as to rotate said masses about said central axis.

12. An apparatus as claimed in claim 1, wherein said forcing means comprises a cam, which is centred on said central axis and fixed with respect to the rotatable masses and arms, and a linking arrangement coupled to said central shaft and to the upper ends of said arms, said linking arrangement being actuable by said cam as said masses rotate about the central axis so as to periodically force said arms towards one another.

13. A gyroscopic apparatus comprising:
a first shaft adapted to be rotated about a precession axis;
at least two second shafts generally disposed orthogonally to said first shaft and coupled to said first shaft and each second shaft having an end carrying a rotatable mass thereon, said masses being substantially diametrically disposed and being rotatable in different directions about a respective shaft axis;
drive means adapted to rotate said orthogonal second shafts and said rotatable masses as said apparatus spins about said precession axis;
mass support means coupled between said first shaft and each orthogonal shaft for supporting each mass during rotation of said gyroscopic apparatus about said precession axis;
mass reciprocating means coupled between said first shaft and said mass support means for causing said masses to reciprocate in rectilinear movement as said masses rotate about said precession axis; and
thrust bearing means disposed on said first shaft at an upper end thereof for transmitting thrust axially along said precession axis, the arrangement being such that, in use, said gyroscopic apparatus is rotated about said precession axis and said masses are rotated about each respective shaft axis and are also reciprocated in a direction substantially orthogonal to said precession axis, and as the speed of rotation reaches a predetermined value, pulsatile force is created which acts through said mass support means to create an upward thrust on said first shaft which transmits said upward thrust to said thrust bearing means.

14. An apparatus as claimed in claim 13, wherein said masses are two diamelectrically opposed rotatable discs.

15. An apparatus as claimed in claim 14, wherein said orthogonal shafts are provided for respective discs and each orthogonal shaft is coupled to said first shaft so as to permit each orthogonal shaft to pivot with respect to the first shaft.

16. An apparatus as claimed in claim 13, wherein said first shaft is a hollow tube adapted to be driven via first gearing means disposed at the lower end of said first shaft.

17. An apparatus as claimed in claim 16, wherein said orthogonal shafts and said masses are driven via said first gearing means and by a second shaft within said first shaft and via second gearing means for passing drive to said orthogonal shafts.

18. An apparatus as claimed in claim 13, wherein said mass support means includes a slide rail which extends orthogonally from the lower end of said first shaft, slidable brackets being slidably mounted on said slide rail, and support arms for respectively supporting the orthogonal shafts adjacent said rotatable masses, said arms being respectively pivotably coupled at the lower end of said arms to said slidable brackets and being respectively coupled by links to respective upper yokes of said slidable brackets.

19. An apparatus as claimed in claim 18, wherein said mass reciprocating means is coupled between said first shaft and each respective bracket such that rotary motion of said shaft is connected to rectilinear movement of said brackets, hence causing said masses to reciprocate in the direction of the slide rail as said masses rotate about said precession axis.

20. An apparatus as claimed in claim 19, wherein said mass reciprocating means is a pair of opposed eccentrics mounted on said first shaft and each eccentric bracket has a connecting rod coupled to a respective bracket.

* * * * *